(12) United States Patent
Hosp

(10) Patent No.: US 8,690,491 B2
(45) Date of Patent: Apr. 8, 2014

(54) ROTARY CUTTING TOOL

(75) Inventor: Andreas Hosp, Berwang (AT)

(73) Assignee: Ceratizit Austria Gesellschaft m.b.H., Reutte/Tirol (AT)

( * ) Notice: Subject to any disclaimer, the term of this patent is extended or adjusted under 35 U.S.C. 154(b) by 209 days.

(21) Appl. No.: 13/185,836

(22) Filed: Jul. 19, 2011

(65) Prior Publication Data

US 2012/0011979 A1 Jan. 19, 2012

(30) Foreign Application Priority Data

Jul. 19, 2010 (AT) .............................. GM454/2010 U

(51) Int. Cl.
*B23C 5/22* (2006.01)

(52) U.S. Cl.
USPC .................................. 407/43; 407/46; 407/52

(58) Field of Classification Search
CPC ...................................... B23C 5/22; B23C 5/20
USPC ............ 407/40, 41, 46, 52, 43; 403/381, 335, 403/337, 362
See application file for complete search history.

(56) References Cited

U.S. PATENT DOCUMENTS

| | | | | |
|---|---|---|---|---|
| 390,034 | A * | 9/1888 | Peckover | 125/13.01 |
| 520,000 | A * | 5/1894 | Hardsocg | 403/381 |
| 1,496,067 | A * | 6/1924 | Penberthy | 279/76 |
| 3,242,553 | A | 3/1966 | Bogsten | |
| 4,359,294 | A * | 11/1982 | Crillesen | 403/359.1 |
| 7,101,121 | B2 | 9/2006 | Wermeister et al. | |
| 2010/0104382 | A1 | 4/2010 | Heinloth et al. | |

FOREIGN PATENT DOCUMENTS

| | | | |
|---|---|---|---|
| DE | 1 427 052 | 10/1969 | |
| DE | 10 2007 013 153 A1 | 9/2008 | |
| EP | 1 356 885 A2 | 10/2003 | |
| GB | 1 053 810 | 1/1967 | |
| JP | 2001-259918 | * 3/2000 | ............... B23C 5/08 |
| JP | 2007-083329 | * 4/2007 | ............... B23C 5/00 |

OTHER PUBLICATIONS

Austrian Patent Office Search Report Dated May 5, 2011.

* cited by examiner

*Primary Examiner* — Andrea Wellington
*Assistant Examiner* — Ryan Rufo
(74) *Attorney, Agent, or Firm* — Laurence A. Greenberg; Werner H. Stemer; Ralph E. Locher

(57) ABSTRACT

A rotary cutting tool has a main body with one or more segments exchangeably fastened to its circumference or internally thereof. The main body and the segment have fitting elements with mutually contacting faces. The exchangeable fastening is effected by a clamping piece, which is dovetailed on two sides and is additionally configured with a taper that wedges in the axial direction. The first dovetail-shaped part of the clamping piece engages in a corresponding recess of the main body and the second dovetail-shaped part of the clamping piece engages in a corresponding recess of the segment.

9 Claims, 3 Drawing Sheets

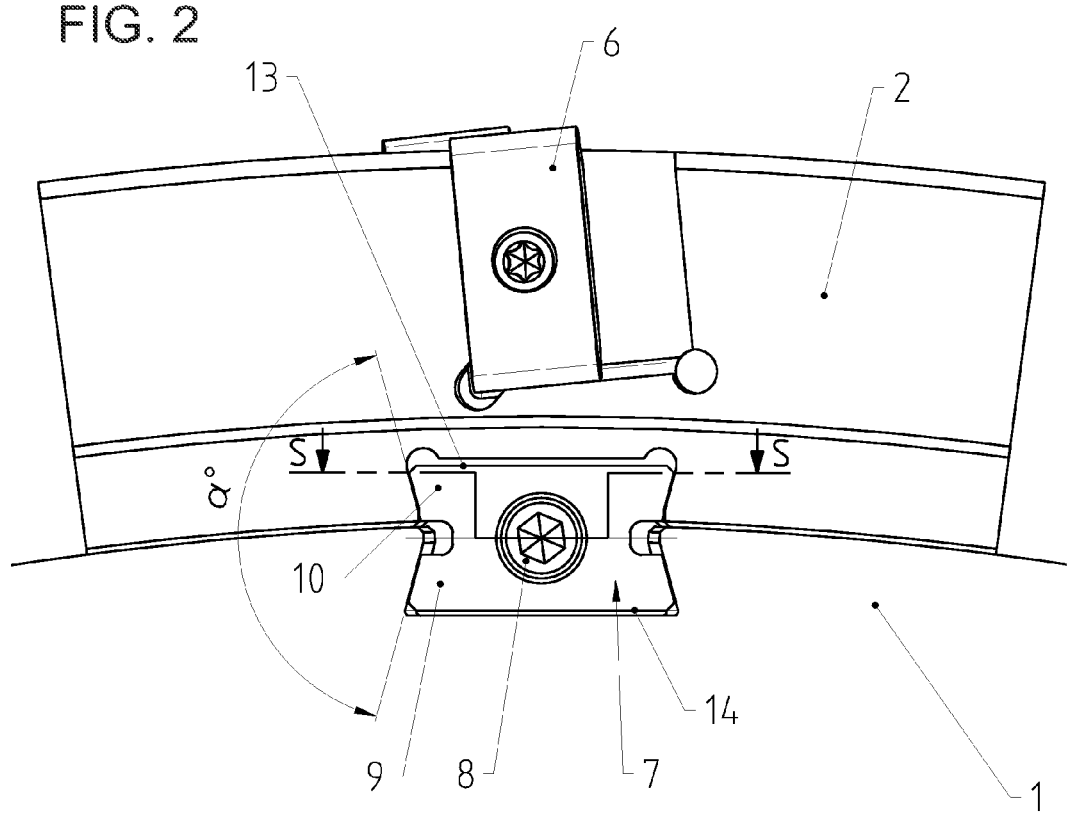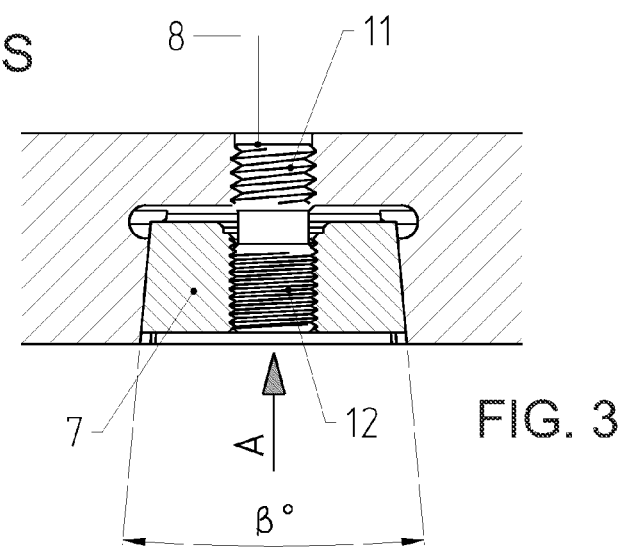

ROTARY CUTTING TOOL

CROSS-REFERENCE TO RELATED APPLICATION

This application claims the priority, under 35 U.S.C. §119, of Austrian application AT GM 454/2010, filed Jul. 19, 2010; the prior application is herewith incorporated by reference in its entirety.

BACKGROUND OF THE INVENTION

Field of the Invention

The invention relates to a rotary cutting tool with a main body, to which at least one segment is exchangeably fastened. The main body and the segment have fitting elements with mutually contacting faces.

Cutting tools of this type are known in the art. They are intended to make it possible for the segments, which are often loaded with cutting inserts, to be exchanged quickly and without any problems.

U.S. Pat. No. 3,242,553 and its counterpart German published patent application DE 14 27 052 A1 describe a disc-type milling cutter which has on the circumferential periphery of a main body a number of segments which are loaded with cutting inserts and are releasably connected to the main body by screwing. At the contact point of the individual segments in relation to one another there is machined into the main body a dovetail-shaped groove, into which wedges that support the rearward ends of the individual segments, as seen in the direction of rotation, are pushed. The rearward flanks of the wedges, as seen in the direction of rotation, and the contacting flanks of the corresponding clearances in the segments are undercut obliquely. The opposite flanks, on the other hand, are configured at right angles.

For the lateral guidance of the segments, the main body is provided centrally with a fitting strip of a trapezoidal cross section, which engages in a correspondingly configured recess of the individual segments. The wedges that are dovetailed on one side serve here merely for taking along segments during the rotational movement of the milling cutter to relieve the screw connection. However, the fastening of the segments to the main body is only possible together with the screws.

SUMMARY OF THE INVENTION

It is accordingly an object of the invention to provide a rotary cutting tool which overcomes the disadvantages of the heretofore-known devices and methods of this general type and which provides for a rotary cutten in which segments can be fastened easily exchangeably to the main body in a simple manner by a clamping piece without a direct screw connection.

With the foregoing and other objects in view there is provided, in accordance with the invention, a rotary cutting tool, comprising:

a main body formed with a recess;
at least one segment formed with a recess;
said main body and said at least one segment having fitting elements with mutually opposite contacting faces;
a clamping piece configured to exchangeably fasten the at least one segment to the main body, the clamping piece being formed with dove-tails on two sides thereof and tapered in wedge form in an axial direction thereof, a first dovetail-shaped part of the clamping piece engaging in a correspondingly formed the recess in the main body and a second dovetail-shaped part of the clamping piece engaging in a correspondingly formed the recess in the at least one segment.

In other words, the above objects are achieved according to the invention in that the exchangeable fastening is effected by a clamping piece, which is dovetailed on two sides and is configured such that it tapers in wedge form in the axial direction A, the first dovetail-shaped part of the clamping piece engaging in a corresponding recess of the main body and the second dovetail-shaped part of the clamping piece engaging in a corresponding recess of the segment.

The double-sided dovetailed configuration of the clamping piece, which on the one hand engages in a recess of the main body and on the other hand engages in the recess of the segment, combined with the wedge-shaped configuration of the clamping piece in the axial direction A achieves a secure connection between the segment and the main body without additional securing means being necessary. The clamping piece is in this case displaced in the axial direction A, in the direction tapering in wedge form, until it is clamped sufficiently strongly. The fitting elements with the mutually contacting faces between the main body and the segment ensure exactly secure positioning between the main body and the individual segments, which is not changed even by introduction of the clamping piece. Displacing the clamping piece counter to the direction tapering in wedge form has the effect of releasing again the connection between the main body and the segment in a simple manner and allowing the segments to be removed from the main body.

In a particularly advantageous refinement of the invention, the fitting elements are configured in the form of webs with a first contacting face, running substantially in the axial direction A, and a second contacting face, running substantially perpendicularly to the axial direction A, on respectively opposing peripheral regions of the main body and of the segment.

In this way, good secure positioning of the main body and the segment in relation to one another is achieved, the fitting elements being easy to fabricate.

In a further advantageous refinement of the invention, the clamping piece is passed through in the axial direction A by a screw, which can be screwed to the main body or the segment.

It is particularly advantageous in this case if the screw has two threaded portions with the same thread direction but different thread pitches.

This configuration has the effect that the screwing in of the screw achieves in a simple manner good wedging of the clamping piece in the recesses of the main body and the segment, which can be released again without any problem by unscrewing the screw.

For the dovetail-shaped parts of the clamping piece it has proven successful if they together form an angle $\alpha$ which lies in a range from 120° to 160°.

For the conicity in the axial direction of the clamping piece it has proven successful that the angle $\beta$ with which the clamping piece tapers in wedge form in the axial direction A lies in a range from 8° to 16°.

The present invention is used particularly advantageously in the case of a disc-type milling cutter with segments arranged circumferentially or internally, the segments being configured as cartridges with exchangeably fastened cutting inserts.

Other features which are considered as characteristic for the invention are set forth in the appended claims.

Although the invention is illustrated and described herein as embodied in a rotary cutting tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is an enlarged detail of the disc-type milling cutter according to FIG. 1 in a rear view;

FIG. 3 is a section taken along the section line S-S in FIG. 2, and viewed in the direction of the downward arrows.

DETAILED DESCRIPTION OF THE INVENTION

Figure 1:
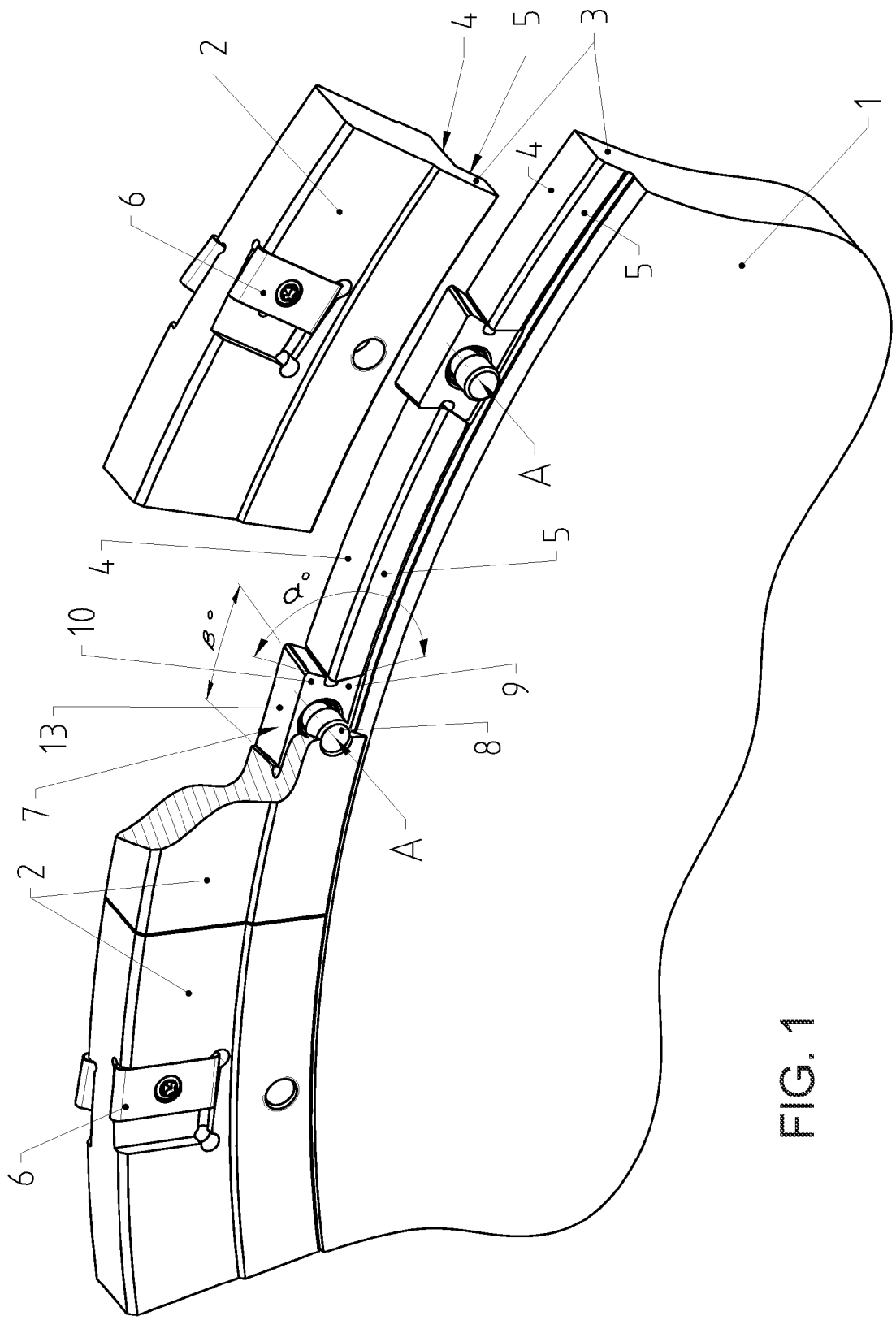
FIG. 1 is a perspective, parly sectional view of a detail of a disc-type milling cutter with circumferentially arranged cartridges with cutting inserts.

Referring now to the figures of the drawing in detail and first, particularly, to FIGS. 1 to 3 thereof, there is shown an exemplary embodiment of the invention, namely, a disc-type milling cutter with circumferentially arranged, exchangeable cartridges with cutting inserts. Only a peripheral region of the disc-type milling cutter is illustrated in the form of a detail. The main body 1 of the disc-type milling cutter has circumferentially on one side at the peripheral region a web-like fitting element 3 with a first contacting face 4 and a second contacting face 5. Circumferentially, a number of segments 2 in the form of cartridges with cutting inserts 6 are exchangeably connected to the main body 1. The segments 2 have circumferentially at the peripheral region in the contact zone with respect to the main body 1 likewise web-like fitting elements 3 with a first contacting face 4 and a second contacting face 5. These web-like fitting elements 3 of the main body 1 and of the segments 2 are arranged on respectively opposing sides, so that the web-like fitting elements 3 of the main body 1 and of the segments 2 engage in the corresponding, adjacently lying recesses and respectively rest against the first and second mutually contacting faces 4 and 5, whereby aligned positioning of the segments 2 with the main body 1 is achieved. Respectively arranged in the central region of the segments 2 is a clamping piece 7 dovetailed on two sides. The clamping piece 7 has a thickness which corresponds approximately to the thickness of the web-like fitting element 3 of the main body 1 and engages with a first dovetail-shaped part 9 in a corresponding recess of the fitting element 3 of the main body 1, while the second dovetail-shaped part 10 engages in a corresponding recess in the region lying thereabove of the respective segment 2. The two dovetail-shaped parts 9, 10 together form an angle α of 150°. In the axial direction A, the clamping piece 7 is configured such that it tapers in wedge form with an angle β of 8°.

The clamping piece 7 is passed through in the axial direction A by a screw 8, which has two threaded portions 11 and 12 with the same thread direction but different thread pitches. The threaded portion 11 with the greater thread pitch engages in a corresponding threaded bore of the respective segment 2, while the threaded portion 12 with the smaller thread pitch engages in a corresponding threaded bore of the clamping piece 7. In this way, quick wedging and releasing of the clamping piece 7 in the corresponding recess of the main body 1 and of the respective segment 2 is achieved when turning the screw 8. At the same time, adequately great force can be applied to the clamping piece 7, so that secure clamping is ensured.

It is important for good wedging and secure positioning of the main body 1 and the segments 2 that the end faces 13 and 14 of the dovetail-shaped parts 9 and 10 that are enclosed by the flanks undercut in a dovetailed manner are non-contacting in the corresponding recesses of the main body 1 and the segment 2. This ensures a slight possibility of automatically aligning the clamping piece 7 during introduction in the recesses, whereby overdetermination of the clamping system, and consequently indeterminate clamping, is ruled out.

Figure 4:
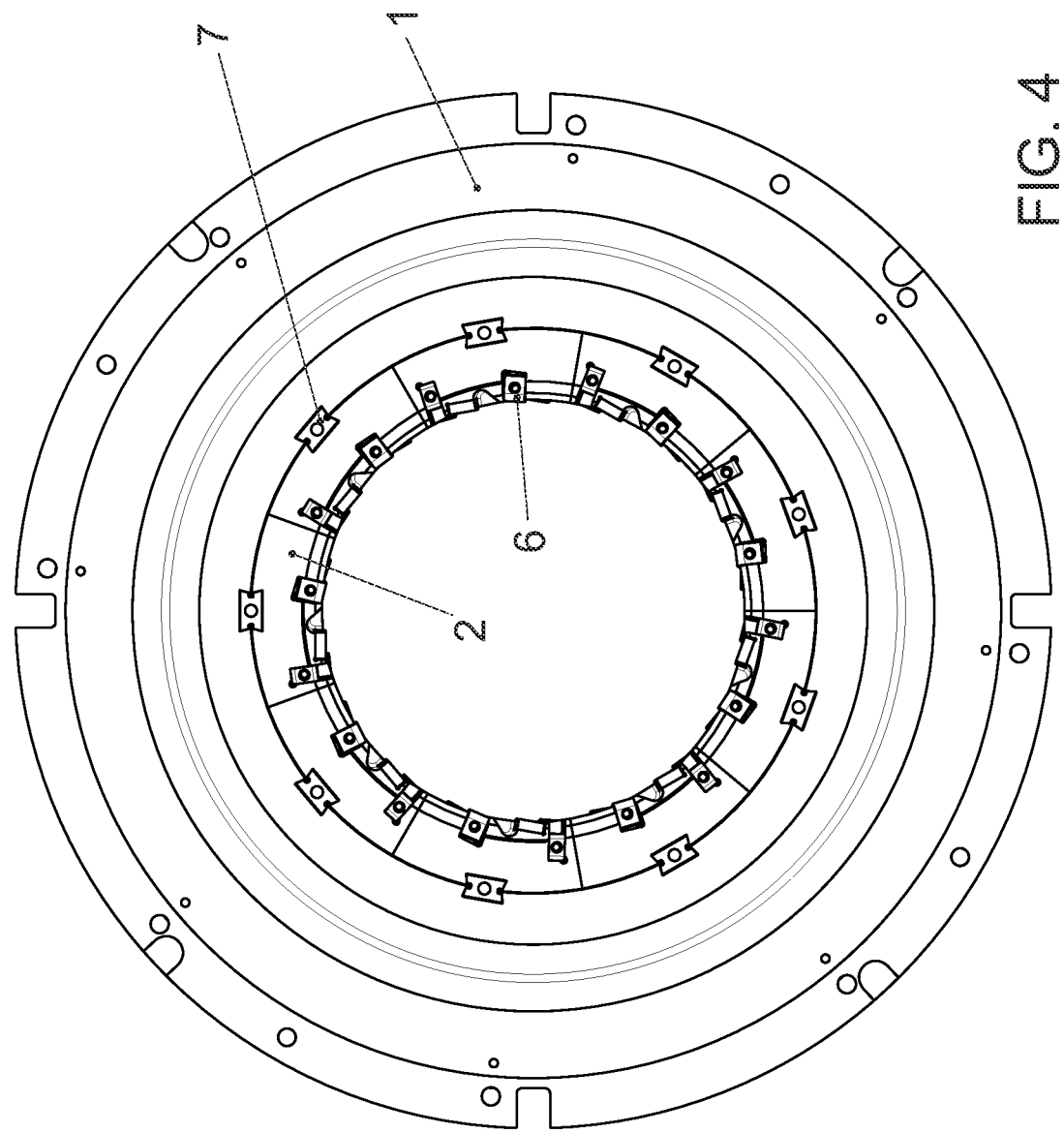
FIG. 4 is a plan view of a disc-type milling cutter with internally arranged cartridges with cutting inserts.

FIG. 4 illustrates an alternative disc-type milling cutter. Here, in contrast with the disc-type milling cutter embodiment of FIGS. 1 to 3, the cartridge segments 2 with the cutting inserts 6 are not configured circumferentially but internally.

It will be understood by those of skill in the pertinent art that the invention is not in any way restricted to disc-type milling cutters but can likewise be used in the case of other rotary cutting tools, such as end milling cutters or drilling tools.

The invention claimed is:

1. A rotary cutting tool, comprising:
a main body formed with a dovetailed recess having two obliquely undercut flanks;
at least one segment formed with a dovetailed recess having two obliquely undercut flanks;
said main body and said at least one segment having fitting elements with mutually opposite contacting faces;
a clamping piece configured to exchangeably fasten said at least one segment to said main body, said clamping piece being formed with dove-tails on two sides thereof, each side having two flanks with dovetail undercuts and tapered in wedge form in an axial direction thereof, a first dovetail-shaped part of said clamping piece engaging in a correspondingly formed said recess in said main body and a second dovetail-shaped part of said clamping piece engaging in a correspondingly formed said recess in said at least one segment.

2. The rotary cutting tool according to claim 1, wherein said fitting elements are webs with a first contacting face, running substantially in the axial direction, and a second contacting face, running substantially perpendicularly to the axial direction, on respectively opposing peripheral regions of said main body and of said at least one segment.

3. The rotary cutting tool according to claim 1, which comprises a screw passing through said clamping piece in the axial direction, and screwed into said main body or into said at least one segment.

4. The rotary cutting tool according to claim 3, wherein said screw is formed with two threaded portions having a common thread direction but mutually different thread pitches.

5. The rotary cutting tool according to claim 1, wherein said two dovetail-shaped parts of said clamping piece enclose an angle α lying in a range from 120° to 160°.

6. The rotary cutting tool according to claim 1, wherein said clamping piece tapers in wedge form in the axial direction A with an angle β lying in a range from 8° to 16°.

7. The rotary cutting tool according to claim 1, wherein said recess in said main body is an undercut recess and said recess in said at least one segment is an undercut recess, each of said undercut recesses corresponding in shape with said dove tails of said clamping piece.

8. The rotary cutting tool according to claim 1, formed as a disc-type milling cutter with a plurality of said segments arranged circumferentially or internally, said segments being configured as cartridges with exchangeably fastened cutting inserts.

9. A rotary cutting tool, comprising:
   a main body formed with a recess;
   at least one segment formed with a recess;
   said main body and said at least one segment having fitting elements with mutually opposite contacting faces;
   a clamping piece configured to exchangeably fasten said at least one segment to said main body, said clamping piece being formed with dove-tails on two sides thereof and tapered in wedge form in an axial direction thereof, a first dovetail-shaped part of said clamping piece engaging in a correspondingly formed said recess in said main body and a second dovetail-shaped part of said clamping piece engaging in a correspondingly formed said recess in said at least one segment; and
   a screw passing through said clamping piece in the axial direction, and screwed into said main body or into said at least one segment, said screw having two threaded portions with a common thread direction but mutually different thread pitches.

* * * * *